(12) United States Patent
Bernstein et al.

(10) Patent No.: US 10,567,411 B2
(45) Date of Patent: Feb. 18, 2020

(54) DYNAMICALLY ADAPTED TRAFFIC INSPECTION AND FILTERING IN CONTAINERIZED ENVIRONMENTS

(71) Applicant: Twistlock, Ltd., Herzliya (IL)

(72) Inventors: Ben Bernstein, New York, NY (US); John Morello, Baton Rouge, LA (US); Dima Stopel, Herzliya (IL); Liron Levin, Herzliya (IL); Eran Yanay, Tel-Aviv (IL)

(73) Assignee: TWISTLOCK, LTD., Herzliya (IL)

( * ) Notice: Subject to any disclaimer, the term of this patent is extended or adjusted under 35 U.S.C. 154(b) by 3 days.

(21) Appl. No.: 15/991,528

(22) Filed: May 29, 2018

(65) Prior Publication Data

US 2018/0278639 A1    Sep. 27, 2018

Related U.S. Application Data

(66) Continuation-in-part of application No. 15/397,230, filed on Jan. 3, 2017, which is a continuation-in-part
(Continued)

(51) Int. Cl.
*H04L 29/06* (2006.01)
*G06F 21/53* (2013.01)
*G06F 21/56* (2013.01)

(52) U.S. Cl.
CPC .......... *H04L 63/1425* (2013.01); *G06F 21/53* (2013.01); *G06F 21/566* (2013.01); *H04L 63/0227* (2013.01)

(58) Field of Classification Search
USPC ........................................ 726/23
See application file for complete search history.

(56) References Cited

U.S. PATENT DOCUMENTS 6,490,620 B1 * 12/2002 Ditmer ................ G06F 11/0709
709/224
6,502,102 B1    12/2002 Haswell et al.
(Continued)

OTHER PUBLICATIONS

Shouman, Mohamed et al. Surviving cyber warfare with a hybrid multiagent-based intrusion prevention system. IEEE Potentials, vol. 29, Issue: 1. https://ieeexplore.ieee.org/stamp/stamp.jsp?tp=&arnumber=5379686 (Year: 2010).*
(Continued)

*Primary Examiner* — Jeremiah L Avery
(74) *Attorney, Agent, or Firm* — M&B IP Analysts, LLC (57) ABSTRACT

A system and method for dynamically adapting traffic inspection and filtering in containerized environments. The method includes monitoring the containerized environment to identify deployment of a software container in the containerized environment; inspecting traffic redirected from the software container, wherein the inspecting includes detecting malicious activity of the software container; and filtering the traffic based on at least one filtering rule when the malicious activity is detected, wherein the at least one filtering rule is defined in a filtering profile for the software container, wherein the filtering profile is determined for the software container when a new container image of the software container is detected in the containerized environment.

23 Claims, 5 Drawing Sheets

Related U.S. Application Data of application No. 15/278,700, filed on Sep. 28, 2016, and a continuation-in-part of application No. 15/292,915, filed on Oct. 13, 2016, now Pat. No. 10,223,534, Substitute for application No. 62/235,644, filed on Oct. 1, 2015.

(60) Provisional application No. 62/521,730, filed on Jun. 19, 2017, provisional application No. 62/274,420, filed on Jan. 4, 2016, provisional application No. 62/274,798, filed on Jan. 5, 2016, provisional application No. 62/235,641, filed on Oct. 1, 2015, provisional application No. 62/241,812, filed on Oct. 15, 2015.

(56) References Cited

U.S. PATENT DOCUMENTS

| | | | |
|---|---|---|---|
| 6,523,027 | B1 | 2/2003 | Underwood |
| 6,704,873 | B1 | 3/2004 | Underwood |
| 6,732,162 | B1 | 5/2004 | Wood et al. |
| 7,100,195 | B1 | 8/2006 | Underwood |
| 7,103,740 | B1 | 9/2006 | Colgrove et al. |
| 7,577,848 | B2 | 8/2009 | Schwartz et al. |
| 7,596,227 | B2 | 9/2009 | Illowsky et al. |
| 7,640,235 | B2 | 12/2009 | Shulman et al. |
| 7,698,741 | B2 | 4/2010 | Marinescu et al. |
| 7,743,420 | B2 | 6/2010 | Shulman et al. |
| 7,752,662 | B2 | 7/2010 | Shulman et al. |
| 7,752,669 | B2 | 7/2010 | Palliyil et al. |
| 7,779,468 | B1 | 8/2010 | Magdych et al. |
| 7,861,303 | B2 | 12/2010 | Kouznetsov et al. |
| 7,882,542 | B2 | 2/2011 | Neystadt et al. |
| 8,024,804 | B2 | 9/2011 | Shulman et al. |
| 8,051,484 | B2 | 11/2011 | Shulman et al. |
| 8,056,141 | B2 | 11/2011 | Shulman et al. |
| 8,108,933 | B2 | 1/2012 | Mahaffey |
| 8,135,948 | B2 | 3/2012 | Shulman et al. |
| 8,181,246 | B2 | 5/2012 | Shulman et al. |
| 8,302,192 | B1 * | 10/2012 | Cnudde ................. H04L 63/145 726/22 |
| 8,316,237 | B1 | 11/2012 | Felsher et al. |
| 8,510,571 | B1 | 8/2013 | Chang et al. |
| 8,621,613 | B1 | 12/2013 | McClintock et al. |
| 8,639,625 | B1 | 1/2014 | Ginter et al. |
| 8,677,472 | B1 | 3/2014 | Dotan et al. |
| 8,756,683 | B2 | 6/2014 | Manion et al. |
| 8,806,625 | B1 | 8/2014 | Berger |
| 8,966,629 | B2 | 2/2015 | Sallam |
| 9,003,141 | B2 | 4/2015 | Nielsen et al. |
| 9,098,333 | B1 | 8/2015 | Obrecht et al. |
| 9,203,862 | B1 | 12/2015 | Kashyap et al. |
| 9,223,966 | B1 | 12/2015 | Satish et al. |
| 9,256,467 | B1 | 2/2016 | Singh et al. |
| 9,355,248 | B1 | 5/2016 | Wiest et al. |
| 9,401,922 | B1 | 7/2016 | Walters |
| 9,594,590 | B2 | 3/2017 | Hsu |
| 9,904,781 | B2 | 2/2018 | Martini et al. |
| 9,928,379 | B1 | 3/2018 | Hoffer |
| 10,223,534 | B2 | 3/2019 | Stopel et al. |
| 2001/0007131 | A1 | 7/2001 | Galasso et al. |
| 2003/0014629 | A1 | 1/2003 | Zuccherato |
| 2003/0079145 | A1 | 4/2003 | Kouznetsov et al. |
| 2003/0120593 | A1 | 6/2003 | Bansal et al. |
| 2003/0229801 | A1 | 12/2003 | Kouznetsov et al. |
| 2003/0233566 | A1 | 12/2003 | Kouznetsov et al. |
| 2003/0233574 | A1 | 12/2003 | Kouznetsov et al. |
| 2004/0133793 | A1 | 7/2004 | Ginter et al. |
| 2005/0120054 | A1 | 6/2005 | Shulman et al. |
| 2005/0177715 | A1 | 8/2005 | Somin et al. |
| 2006/0075494 | A1 | 4/2006 | Bertman et al. |
| 2006/0230451 | A1 | 10/2006 | Kramer et al. |
| 2006/0282664 | A1 | 12/2006 | Zhao |
| 2006/0288420 | A1 | 12/2006 | Mantripragada et al. |
| 2007/0112714 | A1 | 5/2007 | Fairweather |
| 2007/0130621 | A1 | 6/2007 | Marinescu et al. |
| 2007/0136282 | A1 | 6/2007 | Takashima |
| 2007/0174630 | A1 | 7/2007 | Shannon et al. |
| 2007/0240218 | A1 | 10/2007 | Tuvell et al. |
| 2007/0240220 | A1 | 10/2007 | Tuvell et al. |
| 2007/0240221 | A1 | 10/2007 | Tuvell et al. |
| 2007/0240222 | A1 | 10/2007 | Tuvell et al. |
| 2008/0086773 | A1 | 4/2008 | Tuvell et al. |
| 2008/0168135 | A1 * | 7/2008 | Redlich ................. G06Q 10/10 709/204 |
| 2008/0177994 | A1 | 7/2008 | Mayer |
| 2008/0196104 | A1 | 8/2008 | Tuvell et al. |
| 2008/0256636 | A1 | 10/2008 | Gassoway |
| 2009/0144823 | A1 | 6/2009 | Lamastra et al. |
| 2009/0217260 | A1 | 8/2009 | Gebhart et al. |
| 2009/0319796 | A1 | 12/2009 | Kim et al. |
| 2010/0011029 | A1 | 1/2010 | Niemela |
| 2011/0116637 | A1 | 5/2011 | Schiefelbein |
| 2011/0179484 | A1 | 7/2011 | Tuvell et al. |
| 2011/0258701 | A1 | 10/2011 | Cruz et al. |
| 2011/0314542 | A1 | 12/2011 | Viswanathan et al. |
| 2011/0314548 | A1 | 12/2011 | Yoo |
| 2012/0008529 | A1 | 1/2012 | Averbuch et al. |
| 2012/0023584 | A1 | 1/2012 | Yoo |
| 2012/0036572 | A1 | 2/2012 | Yoo |
| 2012/0042375 | A1 | 2/2012 | Yoo |
| 2012/0117203 | A1 | 5/2012 | Taylor et al. |
| 2012/0222123 | A1 | 8/2012 | Williams et al. |
| 2013/0073388 | A1 * | 3/2013 | Heath ................. G06Q 50/01 705/14.53 |
| 2014/0059226 | A1 | 2/2014 | Messerli et al. |
| 2014/0181894 | A1 | 6/2014 | Bokern et al. |
| 2014/0283071 | A1 | 9/2014 | Spikes |
| 2014/0337234 | A1 | 11/2014 | Tang et al. |
| 2015/0156183 | A1 * | 6/2015 | Beyer ................. H04L 63/08 726/4 |
| 2015/0178497 | A1 | 6/2015 | Lukacs et al. |
| 2015/0271139 | A1 | 9/2015 | Lukacs et al. |
| 2015/0332043 | A1 | 11/2015 | Russello |
| 2016/0323315 | A1 | 11/2016 | Hathaway et al. |
| 2017/0063557 | A1 | 3/2017 | Chalmandrier-Perna |
| 2017/0068676 | A1 | 3/2017 | Jayachandran et al. |
| 2017/0177877 | A1 | 6/2017 | Suarez et al. |
| 2017/0244748 | A1 | 8/2017 | Krause et al. |

OTHER PUBLICATIONS

Wang, Haining; Shin, Kang G. Transport-Aware IP Routers: A Built-In Protection Mechanism to Counter DDoS Attacks. IEEE Transactions on Parallel and Distributed Systems, vol. 14, Issue: 9. https://ieeexplore.ieee.org/stamp/stamp.jsp?tp=&arnumber=1233710 (Year: 2003).*

Dhakchianandan, Dhivya S. et al. Memory Efficacious Pattern Matching Intrusion Detection System. 2013 International Conference on Recent Trends in Information Technology (ICRTIT). https://ieeexplore.ieee.org/stamp/stamp.jsp?tp=&arnumber=6844277 (Year: 2013).*

Rehak, Martin et al. Adaptive Multiagent System for Network Traffic Monitoring. IEEE Intelligent Systems, vol. 24, Issue: 3. https://ieeexplore.ieee.org/stamp/stamp.jsp?tp=&arnumber=4983378 (Year: 2009).*

Kovatsch, el al., "A RESTful Runtime Container for Scriptable Internet of Things Applications", 3rd IEEE International Conference on the Internet of Things, Oct. 2012.

Mattetti, et. al., "Securing the Infrastructure and the Workloads of Linux Containers", IEEE Conference on Communications and Network Security (CNS), 2015.

Jan, el al., Robust Container Code Recognition System, Fifth World Congress on Intelligent Control and Automation, 2004.

Linn, et al., "Protecting Against Unexpected System Calls", Department of Computer Science, University of Arizona, Tucson, AZ, 2005, url: https://www.usenix.org/legacy/events/sec05/tech/linn.html, pp. 239-254.

Cooper, et al., "Internet X.509 Public Key Infrastructure Certificate and Certificate Revocation List (CRL) Profile", May 2008, pp. 151.

(56) References Cited

OTHER PUBLICATIONS

Housley, et. al., "Internet X 509 Public Key Infrastructure Certificate and Certificate Revocation List (CRL) Profile", Apr. 2002, pp. 259.
Schneier, Bruce., "Economics of Information Security and Privacy III", 2013, pp. 73-109.
Cziva, et al., "Container-based Network Function Virtualization for Software-Defined Networks," 2015 IEEE Symposium on Computers and Communication (ISCC), pp. 415-420, Scotland.
Dhakchianandan, et al., "Memory Efficacious Pattern Matching Intrusion Detection System", 2013 International Conference on Recent Trends in Information Technology (ICRTIT), pp. 652-656, Anna University, Chennai, India.
Guenane, et al, "Autonomous Architecture for Managing Firewalling Cloud-Based Service," 2014 International Conference and Workshop on the Network of the Future (NOF), Paris, France, pp. 1-5.
Rehak, et al., "Adaptive Multiagent System for Network Traffic Monitoring," IEEE Intelligent Systems, vol. 24, Issue: 3, 2009, Czechia, pp. 17-25.
Shouman, et al., "Surviving Cyber Warfare With a Hybrid Multiagent-based Intrusion Prevention System," IEEE Potentials, vol. 29, Issue: 1, 2010, pp. 32-40.
Song, et al., "A Control Theoretical Approach for Flow Control to Mitigate Bandwidth Attacks," 2006 IEEE Information Assurance Workshop, West Point, NY, pp. 348-360.
Van Niekerk, et al., "Cloud-Based Security Mechanisms for Critical Information Infrastructure Protection," 2013 International Conference on Adaptive Science and Technology, South Africa, pp. 1-4.
Wang, et al., "Transport-Aware IP Routers: A Built-in Protection Mechanism to Counter DDoS Attacks," IEEE Transactions on Parallel and Distributed Systems, vol. 14, Issue: 9, pp. 873-884, Sep. 2003.
Zhauniarovich, et al., "MOSES: Supporting and Enforcing Security Profiles on Smartphones," IEEE Transactions on Dependable and Secure Computing, vol. 11, Issue: 3, pp. 211-223, 2014.

* cited by examiner

DYNAMICALLY ADAPTED TRAFFIC INSPECTION AND FILTERING IN CONTAINERIZED ENVIRONMENTS

CROSS-REFERENCE TO RELATED APPLICATIONS

This application claims the benefit of U.S. Provisional Application No. 62/521,730 filed on Jun. 19, 2017. This application is also a continuation-in-part (CIP) of U.S. patent application Ser. No. 15/397,230 filed on Jan. 3, 2017, now pending, which claims priority from U.S. Provisional Patent Application No. 62/274,420 filed on Jan. 4, 2016, and of U.S. Provisional Patent Application No. 62/274,798 filed on Jan. 5, 2016. The Ser. No. 15/397,230 application is also a CIP of:

a) U.S. patent application Ser. No. 15/278,700 filed on Sep. 28, 2016, now pending, which claims priority from U.S. Provisional Patent Application No. 62/235,644 filed on Oct. 1, 2015, and of U.S. Provisional Patent Application No. 62/235,641 filed on Oct. 1, 2015; and b) U.S. patent application Ser. No. 15/292,915 filed on Oct. 13, 2016, now pending, which claims priority from U.S. Provisional Patent Application No. 62/241,812 filed on Oct. 15, 2015.

The contents of the above-referenced applications are hereby incorporated by reference.

TECHNICAL FIELD

The present disclosure generally relates to cybersecurity systems, and more particularly to traffic inspection and filtering in containerized environments.

BACKGROUND

A software container is an instance of a user-space running an application within the operating system (OS) of a host device (e.g., a server). Software containers enable operating-system-level virtualization in which the OS kernel allows the existence of multiple isolated software containers.

A software container (or a container) provides an executable environment with a complete filesystem. The filesystem may contain code, runtime, system tools, system libraries, and so on. That is, execution of a software container can be the same regardless of the underlying infrastructure. A Docker is one popular existing platform for creating, migrating, managing, and deploying software containers.

A software container, unlike a virtual machine, does not require or include a separate operating system. Rather, the container relies on the kernel's functionality and uses hardware resources (CPU, memory, I/O, network, etc.) and separate namespaces to isolate the application's view of the operating system. A software container can access the OS kernel's virtualization features either directly or indirectly. For example, Linux kernel can be accessed directly using the libcontainer library or indirectly using the libvirt service.

Figure 1:
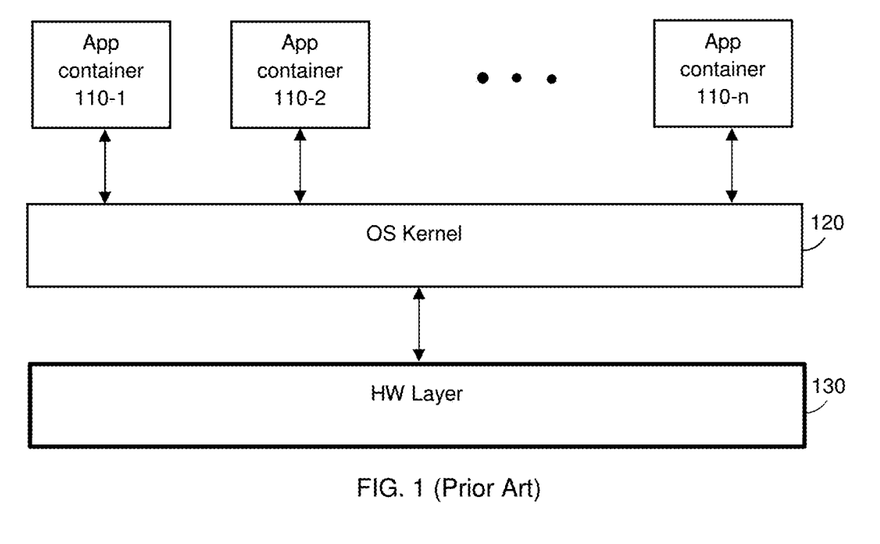
FIG. 1 is a diagram illustrating of execution of a plurality of software containers.

As demonstrated in FIG. 1, a number of software containers (i.e., the app containers 110-1 through 110-n, hereinafter referred to individually as a container 110, merely for simplicity purposes) can access and share the same OS kernel 120. However, each container 110 can be constrained to only use a defined amount of hardware resources (e.g., CPU, memory, etc.) in the underlying hardware layer 130. Thus, using software containers, hardware resources can be isolated, services can be restricted, and processes can be provisioned to have an almost completely private view of the operating system with their own process ID space, file system structure, and network interfaces.

Figure 2:
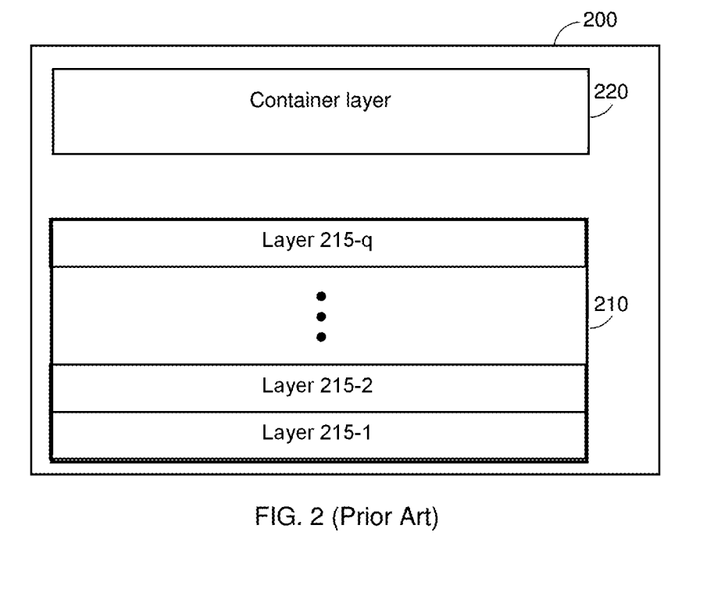
FIG. 2 is a diagram illustrating a structure of a software container.

FIG. 2 illustrates a typical structure of a software container 200. The software container 200 includes a base image 210 and a container layer 220. The base image 210 includes one or more image layers 215-1 through 215-q (hereinafter referred to individually as a layer 215 and collectively as layers 215, merely for simplicity purposes). The layers 215 are read-only layers that represent filesystem differences. That is, the layers 215 are stacked on top of each other to form a base for the root filesystem of the container 200. The layers 215 are read only, and each layer 215 is identified by a randomly generated identifier number of a checksum computed using a hash function. All layers 215 and the base image 210 are collectively referred to as a "container image".

The base image 210 (and its layers 215) can be shared across different software containers. Thus, only the container layer 220 differentiates between one software container and another. The container layer 220 is a readable and writable layer where all data written to the software container 200 is saved in the container layer 220. When the software container 200 is deleted, the writable container layer 220 is also deleted, and the base image 210 remains unchanged. As such, the software container 200 and other software containers (not shown) can share access to the same base image 210, where each software container has its own data state. In the example demonstrated in FIG. 2, the software container 200 is a Docker container (e.g., compliant with the Docker platform).

The popularity of software containers has been increased due to the easy integration with cloud-computing platforms (e.g., Amazon® Web Services, Google® Cloud Platform, Microsoft® Azure, etc.). On such platforms, service providers can offer operating systems to run services and applications. With that said, the increasing reliance on software containers increases the need for secured execution.

Container images are typically uploaded and stored in image registries that may or may not be managed by an organization. Further, the base images are used across many container images of the organization. Therefore, hackers can take advantage of this property of shared images by including malicious code. Such malicious code may carry any type of malware including, for example, computer viruses, worms, Trojan horses, ransomware, spyware, adware, scareware, and the like. Further, such malicious code may be a source for an ATP attack or a distributed denial of service (DDoS) attack when a software container is executed with an infected or malicious image.

Networking between containers is typically accomplished through software defined networks that use multiple layers of abstraction and translation to send traffic between endpoints. Web applications in such environments are often deployed in random servers and accessed via random IP addresses.

Traditionally, web application firewalls (WAFs) is one solution for protecting web applications in such environments. WAF usually require users to manually define static rules for determining what types of applications run on which endpoints and for inspecting traffic based on such determined types. Most WAFs solutions profile the protected applications and inspect traffic directed to such applications. Traffic data that does not match the profiles would be blocked.

However, traditional WAF solutions cannot operate efficiently in containerized environments because the deployment and execution of applications in such environments change rapidly and unpredictably.

For example, a two-tiered web application requires a web server connected to a database. The web server and database are each deployed in their own separate containers using an orchestration tool. At the time of deployment, the orchestration tool determines what servers in a cluster server is best suited to run each container (e.g., the servers with the most resources available) and automatically deploys the containers without further human interaction. Then, the deployed containers are connected to a software defined network (SDN) that spans the hosts and assigned random IP addresses.

As can be understood from the above example, WAF and other application layer filtering solutions that use static rules are infeasible to protect web applications executed in containers, because such solutions cannot determine what applications are currently executed and where they are executed. Thus, no protections can be applied to them, and how to route traffic to the proper destinations.

It would therefore be therefore advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for dynamically adapting traffic inspection and filtering in containerized environments. The method comprises: monitoring the containerized environment to identify deployment of a software container in the containerized environment; inspecting traffic redirected from the software container, wherein the inspecting includes detecting malicious activity of the software container; and filtering the traffic based on at least one filtering rule when the malicious activity is detected, wherein the at least one filtering rule is defined in a filtering profile for the software container, wherein the filtering profile is determined for the software container when a new container image of the software container is detected in the containerized environment.

Certain embodiments disclosed herein also include a non-transitory computer readable medium having stored thereon causing a processing circuitry to execute a process, the process comprising: monitoring the containerized environment to identify deployment of a software container in the containerized environment; inspecting traffic redirected from the software container, wherein the inspecting includes detecting malicious activity of the software container; and filtering the traffic based on at least one filtering rule when the malicious activity is detected, wherein the at least one filtering rule is defined in a filtering profile for the software container, wherein the filtering profile is determined for the software container when a new container image of the software container is detected in the containerized environment.

Certain embodiments disclosed herein also include a system for dynamically adapting traffic inspection and filtering in containerized environments. The system comprises: a processing circuitry; and a memory, the memory containing instructions that, when executed by the processing circuitry, configure the system to: monitor the containerized environment to identify deployment of a software container in the containerized environment; inspect traffic redirected from the software container, wherein the inspecting includes detecting malicious activity of the software container; and filter the traffic based on at least one filtering rule when the malicious activity is detected, wherein the at least one filtering rule is defined in a filtering profile for the software container, wherein the filtering profile is determined for the software container when a new container image of the software container is detected in the containerized environment.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for dynamically adapted traffic inspection and filtering in containerized environments. In an embodiment, deployment of software containers within the containerized environment is monitored to identify deployment of a protected APP container. The protected APP container is a software container configured to execute a specific application. A filtering profile is determined for the protected APP container. Routing rules are applied to redirect traffic to a detector container deployed in the computerized environment. The detector container is configured to inspect and filter the redirected traffic at runtime based on the filtering profile. Additional routing rules may be generated in real-time as additional instances of the protected APP container are deployed in the computerized environment.

In an embodiment, the routing rules are generated based on analysis of the protected APP container. In another embodiment, the routing rules define which ports traffic is to be routed from (i.e., such that traffic is redirected to the detector container when the traffic is originally directed to one of the ports defined in the routing rules).

In an embodiment, container images of the protected APP container to be deployed in a containerized environment are analyzed to determine an application type of an application to be executed by the protected APP container. A container image is a static file and a runtime instance of the analyzed container image is the protected APP container. Based on the determined types, a filtering profile is determined for the protected APP container. The filtering profile defines expected runtime behavior of the protected APP container. The filtering profile further defines what are the likely cyber threats (or attacks) for the protected APP container.

In an embodiment, the detector container is configured to inspect and filter encrypted traffic directed to the protected APP container. To this end, the detector container may be further configured to interface with the protected APP container and a host operating system to retrieve one or more keys for decrypting traffic directed toward the protected APP container, and to decrypt the encrypted traffic to allow for inspection by the detector container. The detector container may be configured to train a machine learning model using the redirected traffic as inputs and filtering data as outputs, and may be further configured to apply the model to dynamically adapt the inspection and filtering based on anomalous activity.

The machine learning model is trained with respect to one or more aspects of the behavior of the protected APP container during normal (i.e., non-malicious) activity. In an embodiment, the learned behavior may be based on resources used by the protected APP container. Such resources may include, but are not limited to, hypertext transfer protocol (HTTP) verbs, application programming interface (API) routes, and query parameters used by the protected APP container.

In another embodiment, the learned behavior includes a pattern of requests and corresponding responses. For example, the learned behavior may include which requests yield specific error codes. In yet another embodiment, the learned behavior includes user interactions with the protected APP container. For example, brute force attacks may be detected based on frequency of user interactions, specific malicious users may be detected based on user interactions as compared to user interactions of non-malicious users, and the like.

The disclosed embodiments therefore allow for dynamically adapting inspection and filtering within containerized environments as new containers and new instances of containers are deployed. Dynamically adapting filtering rules based on deployments of containers or instances of containers further allows for increased security at least as compared to static definitions of deployments and corresponding predetermined filtering configurations.

A software container provides an executable environment with a complete filesystem. A software container may include a micro-service, a Docker container, a light virtual machine, and the like. An application software container ("APP container") is a software container that is configured to execute a specific application at runtime.

Figure 3:
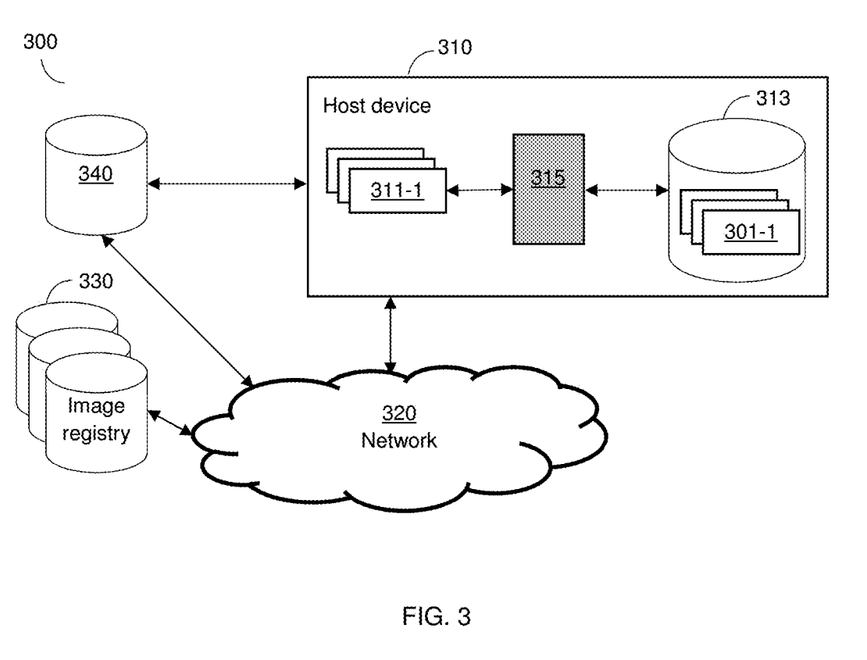
FIG. 3 is a network diagram utilized to describe the various disclosed embodiments.

FIG. 3 is an example network diagram 300 utilized to describe the various disclosed embodiments. A host device 310 is communicatively connected to a network 320. The host device 310 can be realized as a physical machine, a virtual machine, or a cloud infrastructure (Infrastructure as a Service, or IaaS). Examples for such a cloud infrastructure include, but are not limited to, Amazon® Web Services (AWS), Cisco® Metapod, Microsoft Azure®, Google® Compute Engine (GCE), Joyent®, and the like. The host device 310 may be deployed in a datacenter, a cloud computing platform (e.g., a public cloud, a private cloud, or a hybrid cloud), on-premises of an organization, or in a combination thereof. The network 320 may be the Internet, the world-wide-web (WWW), a local area network (LAN), a wide area network (WAN), a metro area network (MAN), and other networks.

The host device 310 is configured to host and execute a plurality of application software containers (APP containers) 311. Each APP container 311 is a software container configured to execute a specific application. The host device 310 is also configured to host and execute a detector container 315. The detector container 315 is a software container configured to inspect and filter traffic as described herein.

In an embodiment, the detector container 315 is configured to intercept any communication into or out of each APP container 311 during runtime of the APP container 311. To this end, the detector container 315 may act as a proxy to the APP container 311. For example, in a Docker architecture, the detector container 315 may proxy any communication between the client and daemon programs of the APP container 311. The intercepted communications may include, for example, system calls, access to a filesystem, access to a virtual machine hosting the APP container, access to a communication port, inbound and outbound network traffic, and so on. Each intercepted communication may be analyzed to identify new container images, detect malicious activity, and the like.

Also connected to the network 320 is one or more image registries 330 (collectively referred to hereinafter as image registries 330 and individually as an image registry 330, merely for simplicity purposes). Each image registry 330 stores container images that can be imported and executed as one of the container images 301 on the host device 310. An example container image is shown in FIG. 2. Each container image 301 is a static file and a runtime instance of the container image 301 is a respective APP container 311 executing a specific application. For example, a protected APP container may be the APP container 311-1 which is a runtime instance of the respective container image 311-1.

An image registry 330 may be, but is not limited to, Docker Hub, Google® Container Registry, Amazon® EC2 Container Registry, Artifactory, and the like. The image registry 330 is a data repository that allows programming and testing of container images. The image registry 330 typically provides a centralized resource for discovery, distribution, management, and collaboration of base images. The image registry 330 may be a cloud-based registry service or may be on-premises.

In certain configurations, the container image 301-1 can be locally stored at the host device 310, e.g., in a registry 313. For example, the registry 313 includes the container image 301-1, where the runtime instance of this image is the APP container 311-1.

In an embodiment, the host device 310 and the detector container 315 are each configured to interface with a continuous integration (CI) system (not shown). Typically, a CI system allows for building, testing, and uploading of container images to the image registries 330. Examples for such a CI system include Jenkins®, Appveyor®, TeamCity, Bamboo, and the like. In an example implementation, the interface between the host device 310 and the CI system may be realized as an application programming interface (API) or a plugin. The host device 310 may also be communicatively connected to a database 340 storing generated filtering profiles and data utilized for determining application types based on container images.

In an embodiment, the detector container 315 is configured to statically analyze the container image 301-1 of the protected APP container 311-1 to be deployed in the host device 310 prior to runtime to determine an application type of each application to be executed by the protected APP container 311-1. In an embodiment, the analysis may include comparing the analyzed container image 301-1 to a plurality of predetermined container images (not shown) associated with known application types stored in, for example, the database 340. As a non-limiting example, an application type may be wordpress.

Containers are immutable and there is a clear binding between images and containers such that it can be definitively determined which application is running in each container. Knowledge of the application executed in the protected APP container 311-1 allows the detector container 315 to determine whether an application layer filter is needed and, if so, which filtering profile should be used.

In an embodiment, the detector container 315 may utilize predetermined attack signatures of common attacks for different types of applications to detect malicious activity related to the protected APP container 311-1. To this end, the detector container 315 may be configured to identify attack signatures associated with the type of application executed in the protected APP container 311-1. In a further embodiment, the detector container 315 may be further configured to retrieve the known attack signatures associated with the application type for the protected APP container 311-1. As an example, a small set of appropriate attack signatures for the application type may be loaded. This use of application-specific attack signatures allows for faster inspection (and, thus, detection of malicious activity) than a traditional firewall, which is not application specific and therefore must inspect with respect to significantly more known attack signatures.

Traffic can be dynamically rerouted to the detector container 315 without requiring any changes to the application itself or the deployment of the application. Because container images are immutable and deterministically unique, all model data for the container images 301, including model data that is automatically learned and model data that is statically discovered from images, can be aggregated across a cluster of containers (e.g., a cluster of the APP containers 311) by sharing data between nodes (i.e., containers). This aggregation allows for adapting filtering by each node to anomalies or other malicious behavior detected for other nodes. Specifically, cluster wide learning can be used to further tune the models and to dynamically improve the model based on runtime events that occur across the cluster. As an example, an anomalous event on one node can be used to trigger more restrictive filtering to be used on other nodes.

In a further embodiment, the detector container 315 is configured to receive an event indicating that a new container image 301-1 in one of the image registries 330 has been changed or added. The detector container 315 is configured to analyze the new container image 301-1. The event includes at least a source of the new container image 301-1 (e.g., a registry's network address or a check-in system) and an identifier of the new container image 301-1. In some implementations, the event may be generated by the host device 310 when a new base image is uploaded to the host or when an image locally stored in the host device 310 is modified. As discussed above, each container image 301 includes a container layer (e.g., the layer 210, FIG. 2) which sets the application executed by a container and a plurality of image layers (e.g., the layers 215, FIG. 2), each of which is uniquely identified. Each container image 301 may be assigned with a unique identifier, which may be computed as a check-sum or hash value computed over the contents of the layer.

In an embodiment, based on the analysis of the new container image 301-1, the detector container 315 may be configured to create a runtime model defining expected runtime behaviors of the respective APP container 311-1 (hereinafter referred to as the "protected APP container 311-1"). The runtime model may be utilized at runtime to identify abnormalities in the protected APP container 311-1. In a further embodiment, based on the identified abnormalities, the runtime model may be updated in real-time, thereby allowing for dynamic adaption of filtering based on newly identified abnormalities. The updating may be based on abnormalities identified with respect to all APP containers 311 deployed in the host device 310, thereby allowing for updating each respective runtime model based on abnormalities within the host device 310.

In an embodiment, based on the determined application types, the detector container 315 is configured to determine a filtering profile for the protected APP container 311-1. Each filtering profile defines rules for inspecting and filtering traffic directed to the protected APP container 311-1. The traffic inspection may include, but is not limited to, input validation using automatically inferred input types, API method validation, communication state monitoring, data leak prevention, malware detection, a combination thereof, and the like. The inspection and filtering may further differ based on particular features of different applications. As a non-limiting example, communication state monitoring between a frontend app and a database app may be different than communication state monitoring between two background apps.

Each filtering profile may further include the runtime model for the protected APP container 311-1. In a further embodiment, the filtering profile may further define rules for inspecting and filtering traffic based on abnormalities in traffic directed to the corresponding protected APP container 311-1. As a non-limiting example, an abnormality detected based on traffic directed to the protected APP container 311-1 may trigger more restrictive filtering on other of the APP containers 311-2 through 311-N, where N is an integer greater than or equal to 2.

In an embodiment, the detection container 315 is configured to monitor deployment of the APP containers 311 within the host device 310 to identify deployment of the protected APP container 311-1. The monitoring may include, but is not limited to, comparing runtime behavior of the protected container 311-1 when executed in the host device 310 to the expected runtime behaviors defined in the runtime model for the protected APP container 311-1. Alternatively or collectively, the monitoring may include detecting a container identifier of the protected APP container 311-1 and comparing the detected container identifier to a container identifiers associated with the protected APP container 311-1 (e.g., based on the unique identifier of the container image 301-1).

In an embodiment, the monitoring may include determining whether each deployed APP container 311 is a protected APP container 311-1 requiring traffic inspection and filtering, a type of the protected APP container 311-1, inspection and filtering configurations for the protected APP container 311-1 (e.g., as indicated in the filtering profile for the protected APP container 311-1), a combination thereof, and the like.

Based on the monitoring, the detection container 315 is configured to generate one or more routing rules. The routing rules define redirection of traffic from the protected APP container 311-1 (e.g., traffic that is incoming to the protected APP container 311-1 or outgoing from the protected APP container 311-1) to the detector container 315. The detector container 315 is configured to inspect and filter the redirected traffic at runtime based on the filtering profile for the protected APP container 311-1. As additional instances of the protected APP container 311-1 are deployed in the host device 310, additional routing rules may be generated in real-time, thereby dynamically adapting the inspection and filtering by the detector container 315 in real-time in response to changes in the host device 310.

In an embodiment, the detector container 315 is configured to inspect and filter encrypted traffic directed to the protected APP container 311-1. The detector container 315 may be further configured to interface with the protected APP container 311-1 and a host operating system (not shown) of the host device 310 to retrieve one or more keys for decrypting traffic directed at the protected APP container 311-1, and to seamlessly decrypt the encrypted traffic to allow for inspection. The retrieved keys may be stored in the detector container 315 without persisting it to disk or moving it outside of the detector container 315, thereby allowing for deployment of containers without requiring provisioning of certificates on border devices.

In an embodiment, the detector container 315 is configured to train a machine learning model using the redirected traffic as inputs and filtering data as outputs, and is further configured to apply the machine learning model to dynamically adapt the filtering based on anomalous activity. In a further embodiment, the machine learning model may be adapted based on traffic redirected from others of the APP containers 311 such that abnormalities in any of the APP containers 311 may trigger changes in filtering to be applied to the protected APP container 311.

In an embodiment, execution of the protected APP container 311-1 may be performed in a quarantined environment, thereby protecting the host device 310 from any potentially dangerous activity or malware of the protected APP container 311-1. This embodiment is further discussed in the above-referenced U.S. patent application Ser. No. 15/278,700, assigned to the common assignee, the contents of which are hereby incorporated by reference.

It should be noted that FIG. 3 is described with respect to detecting malicious activity in a single protected APP container 311-1 merely for example purposes, and that other APP containers may be protected without departing from the scope of the disclosure. The protected APP containers may include other APP containers in the host device 310 (e.g., others of the APP containers 311), APP containers in other host devices (not shown), or a combination thereof.

Figure 4:
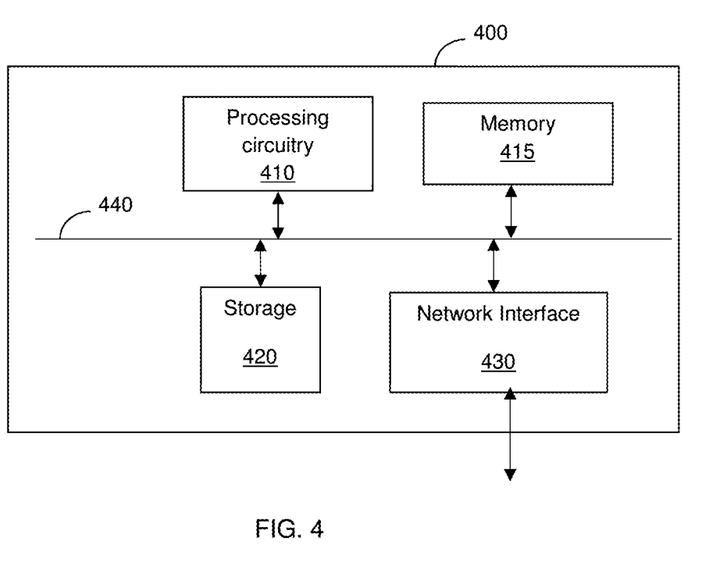
FIG. 4 is a block diagram of a hardware layer in host devices utilized to execute at least a detector container according to an embodiment.

It should also be noted that the host device requires an underlying hardware layer to execute the OS, VMs, and software containers. An example block diagram of a hardware layer 400 is shown in FIG. 4. The hardware layer 400 includes a processing circuitry 410, a memory 415, a storage 420, and a network interface 430, all connected to a computer bus 440.

The processing circuitry 410 may be realized by one or more hardware logic components and circuits. For example, and without limitation, illustrative types of hardware logic components that can be used include Field Programmable Gate Arrays (FPGAs), Application-specific Integrated Circuits (ASICs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory may be volatile, non-volatile, or a combination thereof. The storage may be magnetic storage, optical storage, and the like.

In one configuration, computer readable instructions to implement one or more of the embodiments disclosed herein may be stored in the storage 420. The storage 420 may also store other computer readable instructions to implement an operating system, an application program, and the like. Computer readable instructions may be loaded in the memory for execution by the processing circuitry 410.

In another embodiment, the storage 420, the memory 415, or both, are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various functions described herein.

The network interface 430 allows communication with other external systems or host devices through a network (e.g., the network 320). The network interface 430 may include a wired connection or a wireless connection. The network interface 430 may transmit communication media, receive communication media, or both. The computer bus 440 may be, for example, a PCIe bus.

Figure 5:
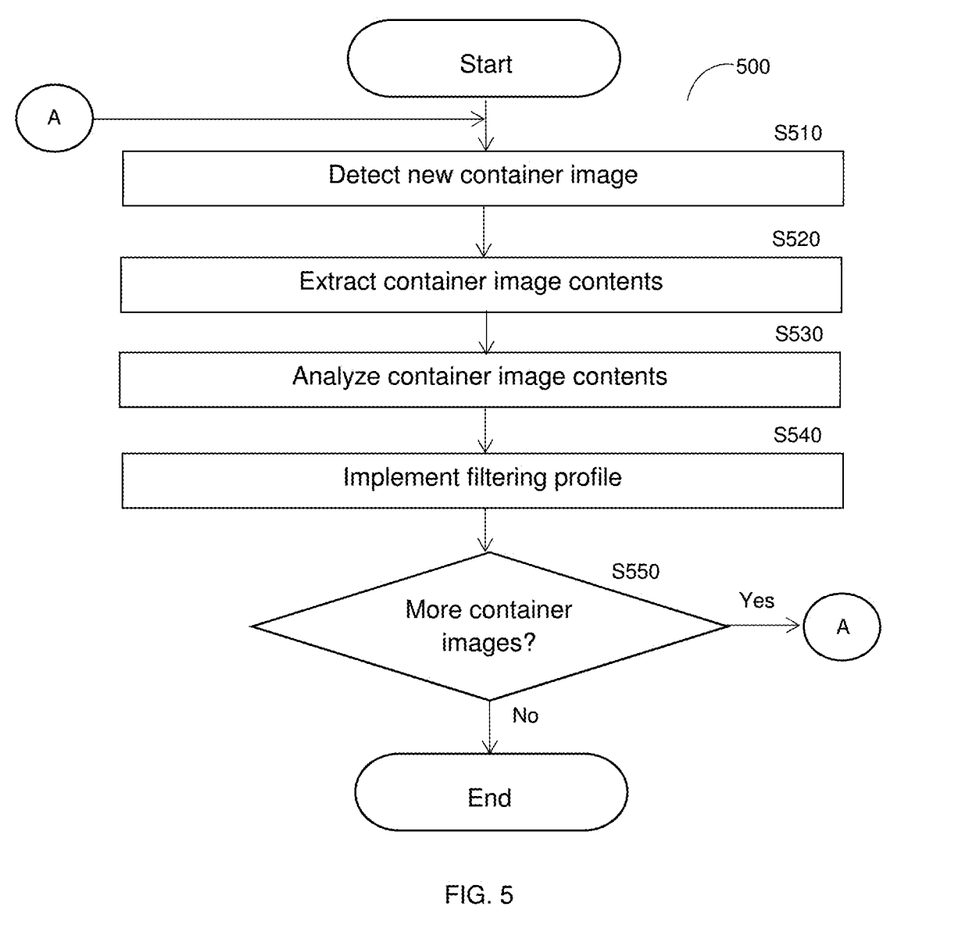
FIG. 5 is a flowchart illustrating a method for determining filtering profiles for dynamically adapted traffic inspection and filtering in a containerized environment according to an embodiment.

FIG. 5 shows an example flowchart 500 illustrating a method for determining filtering profiles for dynamically adapted traffic inspection and filtering in a containerized environment according to an embodiment. In an embodiment, the method is performed by a detector container (e.g., the detector container 315, FIG. 3). The detection container is a first software container deployed in the containerized environment.

At S510, a new container image in a containerized environment (e.g., the host device 310, FIG. 3) is detected. The new container image may be a newly added container image or a changed version of an existing container image such that the detection is of an addition or change of a container image in the containerized environment. Detecting the new container image may include, but is not limited to, receiving an indication that a new container is saved in the registries, an indication from a CI system (or orchestration tool), and the like. In an embodiment, S510 may further include generating an event.

At optional S520, the contents of the container image may be extracted. Specifically, the contents of each layer in the container image may be extracted. In an embodiment, S520 also includes reformatting the container image into a data structure that can be processed.

At S530, the contents of the container image are analyzed to determine a type of application to be executed by a protected APP container (e.g., the protected APP container 311-1, FIG. 3) corresponding to the container image. Specifically, the application layers of the container image are analyzed to determine the type of application to be executed at runtime by the protected APP container. The protected APP container is a second software container deployed in the containerized environment.

In an embodiment, S530 further includes creating a runtime model for the analyzed container image. The runtime model defines expected runtime behavior of the container, thereby allowing for detection of anomalous behavior at runtime.

At S540, based on the analysis, a filtering profile is implemented for the protected APP container. To this end, in an embodiment, S540 includes determining a filtering profile for the protected APP container and filtering malicious traffic when the protected APP container is deployed. Specifically, the filtering profile is determined based on the type of application to be executed by the protected APP container. In an embodiment, implementing the filtering profile is performed as described with respect to FIG. 6.

The protected APP container includes one of the analyzed container images that is determined as requiring inspection and filtering. Each filtering profile defines a configuration for inspecting and filtering traffic directed toward the respective protected APP container. The filtering profile may further include the runtime model for the protected APP container such that particular filtering configurations may be associated with certain runtime behaviors.

The filtering profile may be saved in a central repository and utilized at runtime of the protected APP container to configure a detector container to filter traffic based on the protected APP container's filtering profile.

At S550, it is determined if additional new container images have been detected and, if so, execution continues with S510; otherwise, execution terminates. Accordingly, inspection and filtering by the detector container is dynamically adapted based on additions and changes in container images. In some implementations, after execution of the method of FIG. 5 terminates, execution of a method for runtime traffic inspection and filtering in a containerized environment (e.g., the method of FIG. 6) may begin. Alternatively, the methods may be executed at least partially in parallel, thereby allowing for dynamic adaption both to new container images and to new deployments of containers.

Figure 6:
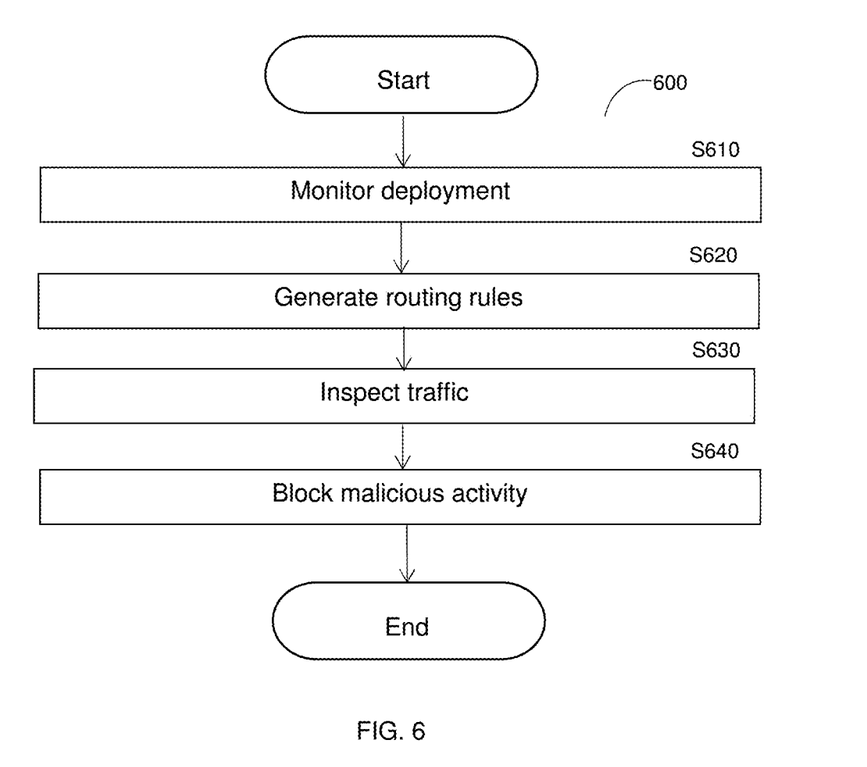
FIG. 6 is a flowchart illustrating a method for dynamically adapted traffic inspection and filtering in a containerized environment according to an embodiment.

FIG. 6 shows an example flowchart 600 illustrating a method for runtime traffic inspection and filtering in a containerized environment according to an embodiment. The method is used to block malicious activity related to a protected APP container (e.g., the protected APP container 311-1, FIG. 3).

At S610, deployment of APP containers in the containerized environment is monitored to identify deployment of the protected APP container. In an embodiment, S610 may include receiving an event from an orchestration system. Such an event may include the servers and network addresses allocated to the protected APP container. In an embodiment, the protected APP container is an APP container including a respective container image that was detected as a new container image, for example as described with respect to FIG. 5.

At S620, one or more routing rules are generated. The routing rules are for redirecting traffic from the protected APP container to a detector container. The redirected traffic is originally directed to the protected APP container or is sent from the protected APP container. The detector container is a software container being executed on a server hosting the protected APP container, i.e., the detector container is deployed in the same containerized environment as the protected APP container. In an embodiment, the detector container is configured to inspect and filter traffic redirected from the protected APP container in accordance with the configuration defined in the filtering profile for the protected APP container.

At S630, traffic redirected to the detector container is inspected, by the detector container, to detect any malicious activity. In an embodiment, the detection is performed based on the runtime model of the protected APP container (e.g., the runtime model created at S530, FIG. 5). It should be noted that the monitored traffic can be encrypted traffic. To this end, the detector container interfaces with the protected APP container and server's operating system at runtime to securely retrieve keys from the protected APP container. Using the retrieved keys, the detector container can terminate the encrypted connection and decrypt the traffic for inspection. This is performed without deploying additional certificates.

The malicious activity may be detected when one or more abnormalities in execution of the protected APP container is detected based on the inspected traffic. In some implementations, the abnormalities may be detected as deviations above a threshold from a baseline, for example, a baseline of a machine learning model trained as described herein above.

At S640, when malicious activity has been detected at S630, such activity is blocked or otherwise mitigated using one or more filtering rules design to block or present certain type of threats. The filtering rules are included in the filtering profile for the protected APP container, for example the filtering profile determined as described herein above with respect to FIG. 5. For example, filtering rules can be used to block SQL injection attacks and cross site scripting attacks.

It should be noted that FIG. 6 is described with respect to monitoring a single instance of a protected APP container merely for simplicity purposes and without limitation on the disclosed embodiments. Multiple instances of the protected APP container may be monitored, at different times or simultaneously, and malicious activity detected for any of the instances may be blocked based on the filtering profile for the protected APP container. Each instance of the protected APP container may be in a different containerized environment hosted on a different server. Each server may include a respective detector container configured to perform the monitoring, inspecting, and blocking of malicious activity.

Following is an example of the methods discussion above with respect to FIGS. 5 and 6. Events indicating new container images "customer/web" and "customer/database" in a server are received from an orchestration tool of the server. The server is a containerized environment hosting software containers. The contents of the container image are extracted and analyzed to determine that "customer/web" is a blog to be protected from cross site scripting attacks and that "customer/database" is a database application to be protected from SQL injection attacks. A runtime model is built for the respective APP container of each of "customer/web" and "customer/database." Filtering profiles including filtering rules for protecting "customer/web" from cross site scripting attacks and for protecting "customer/database" from SQL injection attacks are implemented.

Deployment of APP containers is monitored. During the monitoring, "customer/web" is deployed on the server at a network address and an event indicating the network address of "customer/web" is received from a cluster orchestrator of the server. A routing rule is generated on the server. After generating the routing rule, the server begins redirecting traffic directed at "customer/web" to a detector container executed on the server. The redirected traffic is inspected by the detector container based on the runtime model of "customer/web" to detect malicious activity. When malicious activity indicating a cross site scripting attack is detected, the detector container utilizes a filter for protecting against cross site scripting attacks as defined in the filtering profile.

As demand on the applications grows and "customer/web" and "customer/database" are deployed on more nodes by the orchestrator, additional routing rules are generated and traffic that is redirected from the new instances of "customer/web" and "customer/database" is inspected and, as necessary, filtered, by the detector container. At no point does a user have to manually specify which applications run in which containers, which hosts those containers run on, or which filters should be applied to protect them.

For traffic that is encrypted, the detector container interfaces with the containers and a host operating system of the server at runtime to securely retrieve key material from "customer/web" and "customer/database" silently. The detector container terminates encrypted connections and inspects traffic of the previously encrypted connections without deploying additional certificates.

It should be noted that various embodiments described herein are discussed with respect to "a protected APP container" or "the protected APP container" merely for simplicity purposes, and multiple APP containers may be protected according to the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for dynamic inspection and filtering in a containerized environment, comprising:
    monitoring the containerized environment to identify deployment of a software container in the containerized environment;
    inspecting traffic redirected from the software container, wherein the inspecting includes detecting malicious activity of the software container; and
    filtering the traffic based on at least one filtering rule when the malicious activity is detected, wherein the at least one filtering rule is defined in a filtering profile for the software container, wherein the filtering profile is determined for the software container when a new container image of the software container is detected in the containerized environment.

2. The method of claim 1, further comprising:
    analyzing contents of the new container image to determine a type of application to be executed by the software container; and
    determining, based on the type of application, the filtering profile for the software container.

3. The method of claim 2, further comprising:
    extracting the contents of the new container image, wherein extracting the contents of the new container image includes extracting contents of each layer of the new container image.

4. The method of claim 2, further comprising:
    creating, based on the analysis of the contents of the new container image, a runtime model for the new container image, wherein the runtime model defines expected runtime behavior for the software container executing the new container image, wherein the malicious activity is detected based further on the runtime model.

5. The method of claim 2, further comprising:
    generating, based on the analysis of the contents of the new container image, a routing rule when the deployment of the software container is identified, wherein the routing rule is for redirecting the traffic when the traffic is directed to the software container.

6. The method of claim 2, further comprising:
    determining, based on the analysis of the contents of the new container image, an application type of the new container image, wherein the malicious activity is detected based further on at least one predetermined attack signature associated with the application type.

7. The method of claim 1, wherein the traffic is encrypted traffic, wherein inspecting the traffic further comprises:

interfacing with the software container to retrieve at least one key from the software container; and decrypting the traffic using the retrieved at least one key.

8. The method of claim 1, wherein the malicious activity is detected when an abnormality in execution of the software container is detected, wherein the abnormality is detected as a deviation from learned behavior of the software container.

9. The method of claim 8, wherein the learned behavior includes at least one of: hypertext transfer protocol (HTTP) verbs, application programming interface (API) routes, and query parameters.

10. The method of claim 8, wherein the learned behavior includes a pattern of requests and corresponding responses.

11. The method of claim 8, wherein the learned behavior includes user interactions with the software container.

12. A non-transitory computer readable medium having stored thereon instructions for causing a processing circuitry to execute a process for dynamic inspection and filtering in a containerized environment, the process comprising:

monitoring the containerized environment to identify deployment of a software container in the containerized environment;

inspecting traffic redirected from the software container, wherein the inspecting includes detecting malicious activity of the software container; and filtering the traffic based on at least one filtering rule when the malicious activity is detected, wherein the at least one filtering rule is defined in a filtering profile for the software container, wherein the filtering profile is determined for the software container when a new container image of the software container is detected in the containerized environment.

13. A system for dynamic inspection and filtering, wherein the system hosts a containerized environment, comprising:

a processing circuitry; and a memory, the memory containing instructions that, when executed by the processing circuitry, configure the system to:

monitor the containerized environment to identify deployment of a software container in the containerized environment;

inspect traffic redirected from the software container to the system, wherein the inspecting includes detecting malicious activity of the software container; and filter the traffic based on at least one filtering rule when the malicious activity is detected, wherein the at least one filtering rule is defined in a filtering profile for the software container, wherein the filtering profile is determined for the software container when a new container image of the software container is detected in the containerized environment.

14. The system of claim 13, wherein the system is further configured to:

analyze contents of the new container image to determine a type of application to be executed by the software container; and determine, based on the type of application, the filtering profile for the software container.

15. The system of claim 14, wherein the system is further configured to:

extract the contents of the new container image, wherein extracting the contents of the new container image includes extracting contents of each layer of the new container image.

16. The system of claim 14, wherein the system is further configured to:

create, based on the analysis of the contents of the new container image, a runtime model for the new container image, wherein the runtime model defines expected runtime behavior for the software container executing the new container image, wherein the malicious activity is detected based further on the runtime model.

17. The system of claim 14, wherein the system is further configured to:

generate, based on the analysis of the contents of the new container image, a routing rule when the deployment of the software container is identified, wherein the routing rule is for redirecting the traffic when the traffic is directed to the software container.

18. The system of claim 14, wherein the system is further configured to:

determine, based on the analysis of the contents of the new container image, an application type of the new container image, wherein the malicious activity is detected based further on at least one predetermined attack signature associated with the application type.

19. The system of claim 13, wherein the traffic is encrypted traffic, wherein the system is further configured to:

interface with the software container to retrieve at least one key from the software container; and decrypt the traffic using the retrieved at least one key.

20. The system of claim 13, wherein the malicious activity is detected when at least one abnormality in execution of the software container is detected.

21. The system of claim 20, wherein the learned behavior includes at least one of: hypertext transfer protocol (HTTP) verbs, application programming interface (API) routes, and query parameters.

22. The system of claim 20, wherein the learned behavior includes a pattern of requests and corresponding responses.

23. The system of claim 20, wherein the learned behavior includes user interactions with the software container.

* * * * *

UNITED STATES PATENT AND TRADEMARK OFFICE
CERTIFICATE OF CORRECTION

PATENT NO. : 10,567,411 B2
APPLICATION NO. : 15/991528
DATED : February 18, 2020
INVENTOR(S) : Ben Bernstein et al.

It is certified that error appears in the above-identified patent and that said Letters Patent is hereby corrected as shown below:

On the Title Page

Item (66) Related U.S. Application Data should read:

"Continuation-in-Part of application No. 15/397,230, filed on January 3, 2017, which is a continuation-in-part of application No. 15/278,700, filed on September 28, 2016, and a continuation-in-part of application No. 15/292,915, filed on October 13,2016, now Patent No. 10,223,534,"

"Provisional application No. 62/235,644, filed on October 1, 2015. Provisional application No. 62/521,730, filed on June 19, 2017, provisional application No. 62/274,420, filed on January 4, 2016, provisional application No. 62/274,798, filed on January 5, 2016, provisional application No. 62/235,641, filed on October 1, 2015, provisional application No. 62/241,812, filed on October 15, 2015."

Signed and Sealed this
Twenty-second Day of September, 2020

Andrei Iancu
*Director of the United States Patent and Trademark Office*